United States Patent
Wang et al.

(10) Patent No.: US 11,020,727 B2
(45) Date of Patent: Jun. 1, 2021

(54) $FE_{43.4}PT_{52.3}CU_{4.3}$ POLYHEDRON NANOPARTICLE WITH HETEROGENEOUS PHASE STRUCTURE, PREPARING METHOD AND APPLICATION THEREOF

(71) Applicant: HUBEI UNIVERSITY, Hubei (CN)

(72) Inventors: Hao Wang, Hubei (CN); Xu Chen, Hubei (CN); Hanbin Wang, Hubei (CN); Tianci Wu, Hubei (CN); Haozhao Wan, Hubei (CN); Guokun Ma, Hubei (CN); Jun Zhang, Hubei (CN)

(73) Assignee: HUBEI UNIVERSITY, Hubei (CN)

( * ) Notice: Subject to any disclaimer, the term of this patent is extended or adjusted under 35 U.S.C. 154(b) by 0 days.

(21) Appl. No.: 16/967,417

(22) PCT Filed: Apr. 10, 2019

(86) PCT No.: PCT/CN2019/081982
§ 371 (c)(1),
(2) Date: Aug. 5, 2020

(87) PCT Pub. No.: WO2020/133795
PCT Pub. Date: Jul. 2, 2020

(65) Prior Publication Data
US 2021/0053035 A1    Feb. 25, 2021

(30) Foreign Application Priority Data
Dec. 25, 2018    (CN) .......................... 201811590383.7

(51) Int. Cl.
*B01J 23/745*    (2006.01)
*B01J 35/02*    (2006.01)
(Continued)

(52) U.S. Cl.
CPC ............. *B01J 23/745* (2013.01); *B01J 23/42* (2013.01); *B01J 23/72* (2013.01); *B01J 23/8906* (2013.01);
(Continued)

(58) Field of Classification Search
CPC ...... B01J 23/745; B01J 23/72; B01J 23/8906; B01J 23/8926; B01J 23/42; B01J 35/023;
(Continued)

(56) References Cited

U.S. PATENT DOCUMENTS 3,901,827 A * 8/1975 Sinfelt .................... B01J 37/00
502/245
7,569,115 B2 * 8/2009 Sato ....................... B22F 1/0022
148/306
(Continued)

FOREIGN PATENT DOCUMENTS

CN    10 2218543    * 10/2011 ............... B22F 9/24
CN    102218543 A    10/2011
(Continued)

OTHER PUBLICATIONS

Wenjuan Lei et al., "Cu induced low temperature ordering of fct-FePtCu nanoparticles prepared by solution phase synthesis." Journal of Materials Chemistry C, 7, pp. 11632-11638. (Year: 2019).*
(Continued)

*Primary Examiner* — Patricia L. Hailey

(57) ABSTRACT

A $Fe_{43.4}Pt_{52.3}Cu_{4.3}$ heterogeneous phase structure polyhedron nanoparticle, a preparing method and an application as an efficient fuel cell oxygen reduction catalyst are provided. The $Fe_{43.4}Pt_{52.3}Cu_{4.3}$ heterogeneous phase structure polyhedron nanoparticle, includes: three elements of Fe, Pt and Cu; wherein the $Fe_{43.4}Pt_{52.3}Cu_{4.3}$ heterogeneous phase structure polyhedron nanoparticle has a heterogeneous phase struc-
(Continued)

ture in which face-centered cubic and face-centered tetragonal coexist; wherein the heterogeneous phase structure is a face-centered tetragonal phase shell and face-centered cubic core with a high crystal plane index; a surface of the polyhedron nanoparticle has 1 to 2 atomic layers of enriched with Pt; a diameter distribution of the nanoparticles is at a range of 4.5 to 14.5 nm, and an average size is 8.4 nm. In the invention, hexadecylamine, iron acetylacetonate, copper acetylacetonate, platinum acetylacetonate, and 1,2-hexadecanediol are uniformly mixed, and oleylamine and oleic acid are added, condensed refluxed at 320-330° C.

8 Claims, 6 Drawing Sheets

(51) Int. Cl.
    B01J 37/06    (2006.01)
    B01J 23/89    (2006.01)
    B01J 23/42    (2006.01)
    B01J 23/72    (2006.01)
    B82Y 30/00    (2011.01)
    C22C 5/04    (2006.01)

(52) U.S. Cl.
    CPC ......... B01J 23/8926 (2013.01); B01J 35/023 (2013.01); B01J 37/06 (2013.01); *B82Y 30/00* (2013.01); *C01P 2002/60* (2013.01); *C01P 2002/90* (2013.01); *C01P 2006/17* (2013.01); *C22C 5/04* (2013.01)

(58) Field of Classification Search
    CPC ... B01J 37/06; C01P 2002/60; C01P 2002/90; C01P 2006/17; C22C 5/04; B82Y 30/00

USPC ............. 502/326, 338, 331, 339, 527.24; 420/466, 496, 497, 82, 89; 977/773, 810
See application file for complete search history.

(56) References Cited

U.S. PATENT DOCUMENTS

| 8,158,276 | B2 * | 4/2012 | Hasegawa | C23C 14/3414 |
| | | | | 428/836.1 |
| 2008/0248372 | A1 * | 10/2008 | Min | H01M 4/921 |
| | | | | 429/483 |
| 2009/0155630 | A1 * | 6/2009 | Momose | B22F 9/24 |
| | | | | 428/835 |

FOREIGN PATENT DOCUMENTS

| CN | 10 4157384 | * | 11/2014 | ............. A61K 47/02 |
| CN | 104157384 | A | 11/2014 | |
| CN | 10 5727993 | * | 7/2016 | ............. B01J 23/89 |
| CN | 105727993 | A | 7/2016 | |
| WO | 2005009653 | A1 | 2/2005 | |

OTHER PUBLICATIONS

Wenjuan Lei et al., "A general strategy for synthesizing high-coercivity L10-FePt nanoparticles." Nanoscale, 9, pp. 12855-12861. (Year: 2017).*

Yu-ping Mu et al., "One-Step Preparation of fct-Structure FePt Nanoparticles by Doping Cu." Metallic Functional Materials, vol. 21, No. 1, pp. 12-16. (Year: 2014).*

Xu Chen et al., "Core/shell Cu/FePtCu nanoparticles with face-centered tetragonal texture: An active and stable low-Pt catalyst for enhanced oxygen reduction." Nano Energy 54, pp. 280-287. (Year: 2018).*

* cited by examiner (a) (b)

(a)

(b)

$Fe_{43.4}Pt_{52.3}Cu_{4.3}$ POLYHEDRON NANOPARTICLE WITH HETEROGENEOUS PHASE STRUCTURE, PREPARING METHOD AND APPLICATION THEREOF

BACKGROUND OF THE PRESENT INVENTION

Field of Invention

The present invention belongs to the field of nanotechnology and catalysis, and more particularly to $Fe_{43.4}Pt_{52.3}Cu_{4.3}$ heterojunction conformation polyhedron nanoparticle, a preparing method and an application thereof as an oxygen reduction electrocatalyst in a fuel cell.

Description of Related Arts

FePt alloy nanoparticles have great potential in both oxygen reduction reaction (ORR) electrocatalysis and high density magnetic recording. Meanwhile, their performance depends on the composition and structure of the nanoparticles. Proton exchange membrane fuel cells, as a novel electrochemical energy conversion device, have the merits of high energy conversion efficiency, environmental benign with low carbon dioxide emissions, and renewable fuel sources. However, the bottleneck of fuel cell large-scale application is the kinetics slow ORR, and thus require a high-loading of platinum (Pt) catalyst, results in high cost of the fuel cell device. In fact, Pt accounts for more than 50% of the cost of an entire fuel cell device. In addition, Pt catalyst has problems of dissolution, agglomeration, and poisoning. Low-Pt catalysts strategies, including Pt-based alloys and core-shell structures, can effectively improve activity and stability of Pt atoms, and thus reduce the Pt loading. Among them, the face-centered tetragonal (fct) phase and hard magnetic FePt alloy nanoparticles show better catalytic activity and stability than the face-centered cubic (fcc) and soft magnetic FePt or pure Pt. However, the synthesis of fct-FePt alloy and its core-shell structure usually introduces complex chemical reactions, multiple steps such as high temperature annealing, which cause particles aggregation. At the same time, the ORR catalytic mechanism of Pt-based alloy catalysts is not sufficiently revealed.

FePt nanoparticles synthesized by chemical methods usually have a fcc phase, which need to be annealed at a temperature higher than 550° C. to be converted into fct phase, wherein the process is called phase transition. However, thermal treatment can introduce problems such as particle agglomeration and even sintering, which is detrimental to the ORR performance of the nanoparticles. The ORR reaction is essentially a heterogeneous and surface electrocatalysis reaction, and previous studies have shown that the high crystal index planes of Pt-based alloy nanostructures have higher ORR catalytic activity. Therefore, shape and exposed surface of FePt nanoparticles play an important role in ORR.

For the above reasons, the application is hereby submitted.

SUMMARY OF THE PRESENT INVENTION

In view of the insufficiency of the prior techniques, a first objective of the present invention is to provide a synthesis method of a $Fe_{43.4}Pt_{52.3}Cu_{4.3}$ polyhedron nanoparticle with heterogeneous structure for high performance ORR catalysis.

In order to achieve the first objective of the present invention, the technical solution adopted by the present invention is as follows.

A $Fe_{43.4}Pt_{52.3}Cu_{4.3}$ polyhedron nanoparticle with heterogeneous structure phase, characterized by constituting by Fe, Pt and Cu compositions; wherein the $Fe_{43.4}Pt_{52.3}Cu_{4.3}$ heterogeneous phase structure polyhedron nanoparticle has a heterogeneous phase structure in which face-centered cubic and face-centered tetragonal coexist; wherein the heterogeneous phase structure is a face-centered tetragonal phase shell and face-centered cubic core with a high crystal plane index; a surface of the polyhedron nanoparticle has 1 to 2 atomic layers of enriched with Pt; a diameter distribution of the nanoparticles is at a range of 4.5 to 14.5 nm, and an average size is 8.4 nm.

A second object of the present invention is to provide a method for preparing the $Fe_{43.4}Pt_{52.3}Cu_{4.3}$ heterogeneous phase structure polyhedron nanoparticle as recited in claim 1, comprising steps of:

(1) taking an appropriate amount of liquid cetylamine solvent and placing in a four-necked glass flask, then passing high purity nitrogen into the four-necked glass flask for 20-40 minutes, and then sequentially adding iron acetylacetonate, copper acetylacetonate, platinum acetylacetonate and 1,2-hexadecanediol to the four-necked glass flask, and finally stirring at 80 to 120° C. until raw materials are completely dissolved, wherein an entire stirring process is performed under a nitrogen flow to obtain a reaction precursor solution;

(2) adding oleylamine and oleic acid to the reaction precursor solution obtained in step (1) according to a ratio, and continually stirring at 80-120° C. until completely and uniformly mixed, and continuing to pass nitrogen into a reaction system;

(3) slowly heating the solution obtained by uniformly mixing in step (2) to a temperature at a range of 320-330° C., condensing and refluxing for 3 hours, and controlling an entire reaction process to be performed under stirring and nitrogen flow;

(4) after the reaction is completed, the terminating heating, and naturally cooling a temperature of the reaction system to 80° C., taking outa product obtained, centrifuging, washing for 2 to 4 times to obtain a washed black residual product, which is the $Fe_{43.4}Pt_{52.3}Cu_{4.3}$ heterogeneous phase structure polyhedron nanoparticle in the present invention.

Furthermore, in the technical solution mentioned above, the liquid cetylamine solvent in the step (1) is prepared by melting solid cetylamine, wherein a melting temperature is at a range of 60 to 100° C., preferably 80° C.

Furthermore, in the technical solution mentioned above, a molar ratio of the iron acetylacetonate, the copper acetylacetonate, and the platinum acetylacetonate in the step (1) is 1:1:2.

Furthermore, in the technical solution mentioned above, an amount ratio of the cetylamine to the platinum acetylacetonate in step (1) is 50 ml: 1 mmol Furthermore, in the technical solution mentioned above, in step (1), a molar ratio of the platinum acetylacetonate to the 1,2-hexadecanediol in the step (1) is 4:15.

Furthermore, in the technical solution mentioned above, wherein in step (2), a molar ratio of the oleylamine to the platinum acetylacetonate is 20:1; a molar ratio of the oleylamine to the oleic acid is 1:1.

Furthermore, in the above technical solution, the solvent for cleaning the product in step (4) is a mixed solution of absolute ethanol and n-hexane in a volume ratio of 1:1.

A third object of the present invention is to provide an application of $Fe_{43.4}Pt_{52.3}Cu_{4.3}$ heterogeneous phase structure polyhedron nanoparticle synthesized by the above method, which can be used as an oxygen reduction catalyst in a fuel battery.

An oxygen reduction catalyst comprises the $Fe_{43.4}Pt_{52.3}Cu_{4.3}$ heterogeneous phase structure polyhedron nanoparticles mentioned above.

According to the present invention, a method of synthesizing a Cu-doped organic solvent in one step synthesizes a heterogeneous phase structure having an average size of 8.4 nm and having a face-centered cubic phase and a face-centered tetragonal phase. The phase shell layer and the face-centered cubic phase nucleus, and the surface of the polyhedral particle have 1 to 2 atomic layers of Pt-rich and high ORR catalytic performance $Fe_{43.4}Pt_{52.3}Cu_{4.3}$ polyhedral nanoparticles.

Compared with the prior art, the $Fe_{43.4}Pt_{52.3}Cu_{4.3}$ heterostructure conformation polyhedron nanoparticle oxygen reduction catalyst and the preparation method and application thereof of the present invention have the following beneficial effects.

(1) The nanoparticle structure synthesized by the present invention is a heterostructure phase in which the fcc and fct phases coexist, the bulk phase is mainly face-centered cubic, and the exposed surface is the face-centered tetragonal phase (111), (110), and (001) crystals, wherein the (111) crystal plane is dominant; the particle surface has a Pt-rich layer with a thickness of one or two atomic layers. Therefore, the nanoparticles synthesized by the present invention are low-Pt alloy nanoparticles whose structure and shape are favorable for ORR catalysis.

(2) The $Fe_{43.4}Pt_{52.3}Cu_{4.3}$ polyhedral nanoparticles synthesized by the present invention have excellent ORR performance, with a half-wave potential of 0.80V, which is better than that of a commercial Pt/C catalyst under the same test conditions with half-wave potential of 0.75V, wherein the polarization voltage is reduced by 50 mV. In addition, under half-wave potential conditions, the mass activity of $Fe_{43.4}Pt_{52.3}Cu_{4.3}$ polyhedral nanoparticles synthesized by the present invention is 10.9 times that of commercial Pt/C.

(3) The synthetic method of the present invention is simple and easy to operate, has a wide range of raw materials, low cost, is conducive to large-scale production, and has potential application value in the fields of electro catalysis and high-density magnetic recording.

DETAILED DESCRIPTION OF THE PREFERRED EMBODIMENT

Figure 1:
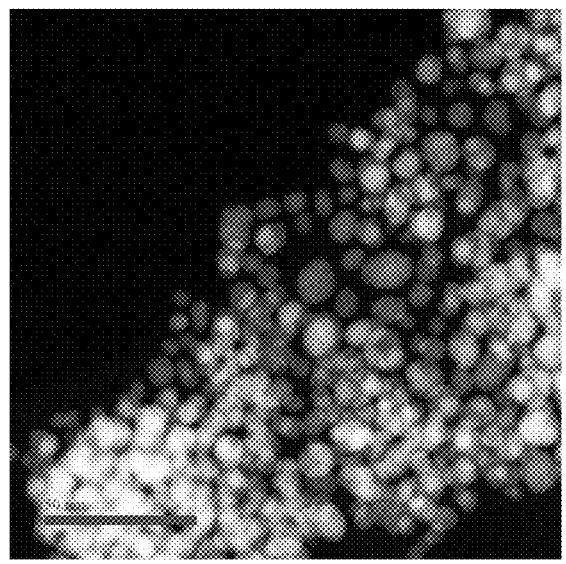
FIGS. 1(a) and (b) are respectively low-magnification STEM images and particle size statistics diagrams of the $Fe_{43.4}Pt_{52.3}Cu_{4.3}$ polyhedral nanoparticles prepared in Embodiment 1 of the present invention.
Figure 1:
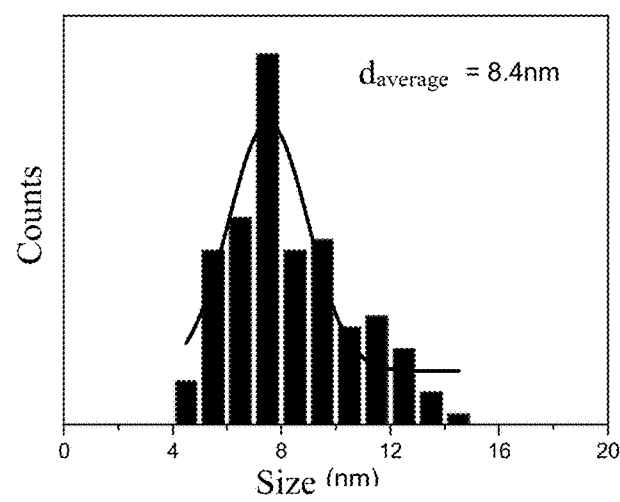

The present invention will be further described in detail below with reference to the accompanying drawings and specific implementation examples. This embodiment is implemented on the premise of the technology of the present invention, and detailed implementations and specific operating procedures are now given to illustrate the invention is inventive, but the scope of protection of the present invention is not limited to the following implementation cases.

Based on the information contained in this application, various changes in the precise description of the invention can be easily made by those skilled in the art without departing from the spirit and scope of the appended claims. It should be understood that the scope of the invention is not limited to the defined processes, properties, or components, as these embodiments and other descriptions are merely for illustrative purposes to illustrate specific aspects of the invention. In fact, it will be apparent to those skilled in the art or related fields that various changes that can be made to the embodiments of the present invention are within the scope of the appended claims.

In order to better understand the present invention without limiting the scope of the present invention, all numbers used in the present application indicating amounts, percentages, and other numerical values are to be understood in all cases as modified by the word "about". Therefore, unless stated otherwise, the numerical parameters set forth in the description and appended claims are approximations that may vary depending on the ideal properties sought to be obtained. Individual numerical parameters should be considered, at a minimum, based on the significant figures reported and through conventional rounding methods.

Embodiment 1

In this embodiment, a method for preparing the $Fe_{43.4}Pt_{52.3}Cu_{4.3}$ polyhedron nanoparticle with heterogeneous phase structure comprising steps of:

(1) melting cetylamine in a solid state into a liquid state at 80° C.;

(2) taking 20 ml of cetylamine solvent melted in the liquid state in step (1) and placing in a four-necked glass flask, then passing high-purity nitrogen into the four-necked glass flask for 30 min, and then adding 0.2 mmol of iron acetylacetonate, 0.2 mmol of copper acetylacetonate, 0.4 mmol of platinum acetylacetonate, and 1.5 mmol of hexadecanediol in sequence to the cetylamine solvent, and finally stirring at 80° C. for 10 min to completely dissolve solid raw materials, wherein a whole stirring process is performed under a condition of nitrogen flow to obtain a reaction precursor solution;

(3) adding 8 mmol of oleylamine and 8 mmol of oleic acid to the reaction precursor solution obtained in step (2), and continuing stirring at 80° C. until the solution is completely and uniformly mixed, and continuing to pass nitrogen into a reaction system;

(4) heating the solution completely and uniformly mixed in step (3) to a temperature of 320° C., performing reflux condensation for 3 hours, wherein a whole reaction process is controlled to be carried out under agitation and nitrogen flow;

(5) after the reaction is completed, terminating heating and allowing the reaction solution to cool naturally at a room temperature, when the temperature drops to 80° C., adding 50 ml of a mixed solvent composed of anhydrous ethanol and n-hexane in a volume ratio of 1:1 to an obtained product, then dividing into aliquots and transferring into a centrifuge tube, centrifuging at 5000 r/min, removing a supernatant with yellow-brown color obtained by centrifugation, and then adding an identical mixed solvent with the same proportion to the centrifuge tube, centrifuging, and repeating the operation three times in the same way until the supernatant is colorless and transparent, and in such a manner that a washed black residual product is obtained, that is, the $Fe_{43.4}Pt_{52.3}Cu_{4.3}$ polyhedron nanoparticle with the heterogeneous phase structure according to the present invention.

The following specifically analyzes the test results of the $Fe_{43.4}Pt_{52.3}Cu_{4.3}$ polyhedron nanoparticle with heterogeneous phase structure prepared in the Embodiment 1:

FIG. 1 is a low-resolution STEM image and a statistical analysis diagram of a particle size of $Fe_{43.4}Pt_{52.3}Cu_{4.3}$ nanoparticles synthesized in the Embodiment 1. It can be seen from FIG. 1 that the nanoparticles synthesized in this embodiment have a uniform size, a diameter at a range of 4.5 to 14.5 nm, and an average size of 8.4 nm.

Figure 2:
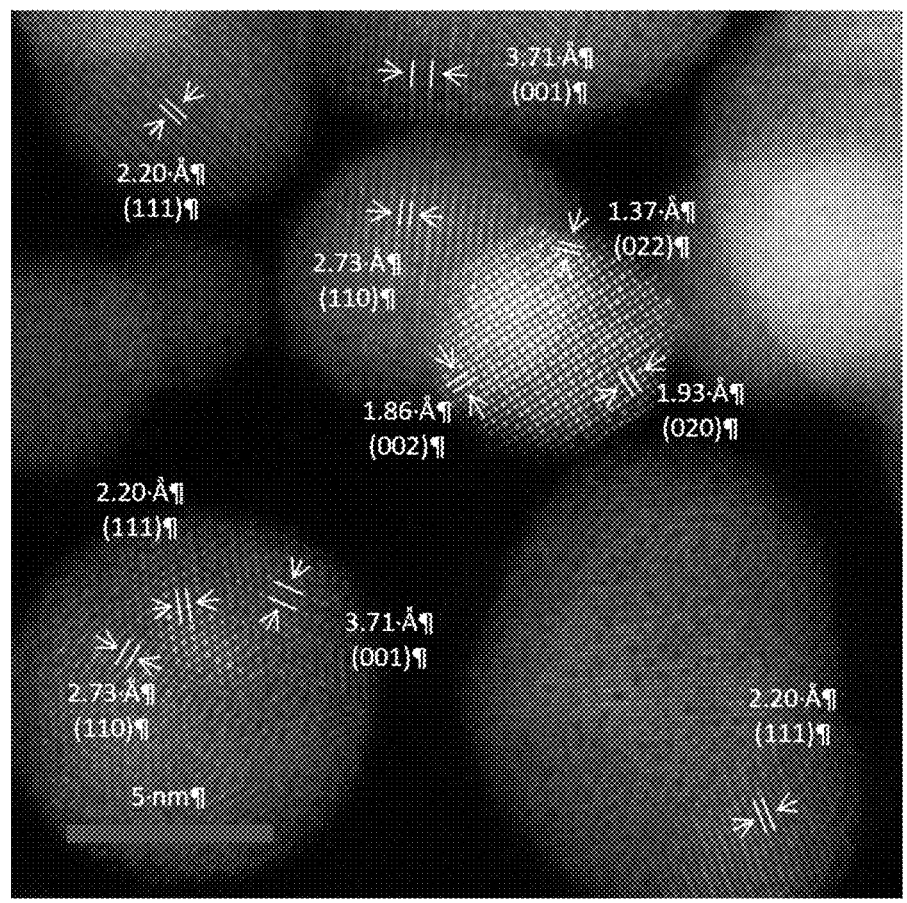
FIG. 2 is a high-resolution STEM image of $Fe_{43.4}Pt_{52.3}Cu_{4.3}$ polyhedral nanoparticles prepared in Embodiment 1 of the present invention.

FIG. 2 is a high-resolution STEM image and crystal structure analysis of the $Fe_{43.4}Pt_{52.3}Cu_{4.3}$ nanoparticles synthesized in the Embodiment 1. It can be seen from FIG. 2 that the obtained particle body phase mainly has a face-centered cubic structure, the particles have apparent surface crystal planes exposed, and some of the particle surfaces have characteristic crystal planes (001) and (110) with the face-centered tetragonal structure. It is shown that the synthesized $Fe_{43.4}Pt_{52.3}Cu_{4.3}$ nanoparticles are partially heterogeneous phase polyhedral particles in which fcc and fct coexist.

Figure 3:
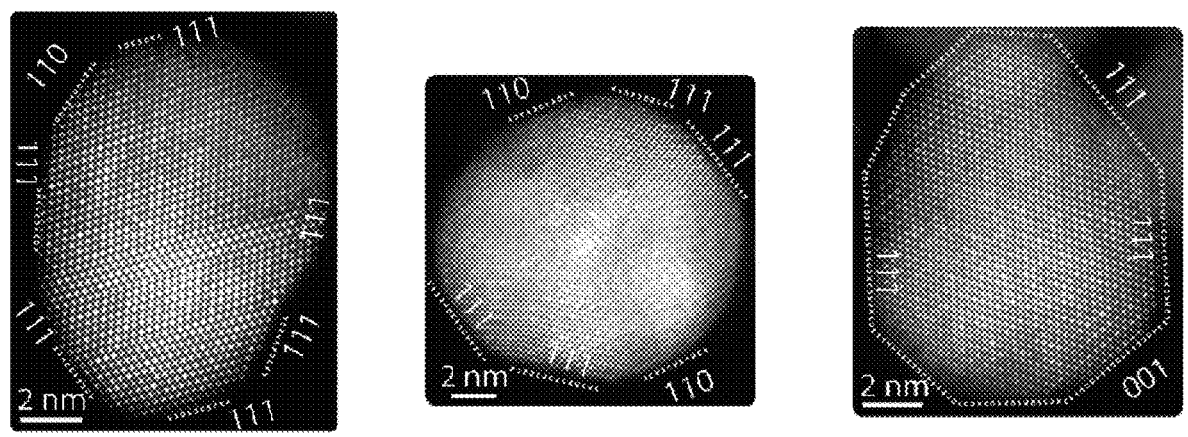
FIG. 3 is an analysis diagram of an exposed crystal plane of a single $Fe_{43.4}Pt_{52.3}Cu_{4.3}$ polyhedron nanoparticle prepared in Embodiment 1 of the present invention.

FIG. 3 is a high-resolution STEM image and a surface exposed crystal plane analysis image of a single $Fe_{43.4}Pt_{52.3}Cu_{4.3}$ nanoparticle of the product synthesized in the Embodiment 1. The results show that the exposed crystal planes are the (001), (110) and (111) crystal planes with the face-centered tetragonal phase.

Embodiment 2

In this embodiment, a method for preparing the $Fe_{43.4}Pt_{52.3}Cu_{4.3}$ polyhedron nanoparticle with heterogeneous phase structure comprising steps of:

(1) melting cetylamine in a solid state into a liquid state at 60° C.;

(2) taking 100 ml of cetylamine solvent melted in the liquid state in step (1) and placing in a four-necked glass flask, then passing high-purity nitrogen into the four-necked glass flask for 30 min, and then adding 1 mmol of iron acetylacetonate, 1 mmol of copper acetylacetonate, 2 mmol of platinum acetylacetonate, and 7.5 mmol of hexadecanediol in sequence to the cetylamine solvent, and finally stirring at 100° C. for 10 min to completely dissolve solid raw materials, wherein a whole stirring process is performed under a condition of nitrogen flow to obtain a reaction precursor solution;

(3) adding 40 mmol of oleylamine and 40 mmol of oleic acid to the reaction precursor solution obtained in step (2), and continuing stirring at 100° C. until the solution is completely and uniformly mixed, and continuing to pass nitrogen into a reaction system;

(4) heating the solution completely and uniformly mixed in step (3) to a temperature of 325° C., performing reflux condensation for 3 hours, wherein a whole reaction process is controlled to be carried out under agitation and nitrogen flow;

(5) after the reaction is completed, terminating heating and allowing the reaction solution to cool naturally at a room temperature, when the temperature drops to 80° C., adding 250 ml of a mixed solvent composed of anhydrous ethanol and n-hexane in a volume ratio of 1:1 to an obtained product, then dividing into aliquots and transferring into a centrifuge tube, centrifuging at 4000 r/min, removing a supernatant with yellow-brown color obtained by centrifugation, and then adding an identical mixed solvent with the same proportion to the centrifuge tube, centrifuging, and repeating the operation three times in the same way until the supernatant is colorless and transparent, and in such a manner that a washed black residual product is obtained, that is, the $Fe_{43.4}Pt_{52.3}Cu_{4.3}$ polyhedron nanoparticle with the heterogeneous phase structure according to the present invention.

Embodiment 3

In this embodiment, a method for preparing the $Fe_{43.4}Pt_{52.3}Cu_{4.3}$ polyhedron nanoparticle with heterogeneous phase structure comprising steps of:

(1) melting cetylamine in a solid state into a liquid state at 100° C.;

(2) taking 40 ml of cetylamine solvent melted in the liquid state in step (1) and placing in a four-necked glass flask, then passing high-purity nitrogen into the four-necked glass flask for 30 min, and then adding 0.4 mmol of iron acetylacetonate, 0.40 mmol of copper acetylacetonate, 0.8 mmol of platinum acetylacetonate, and 3 mmol of hexadecanediol in sequence to the cetylamine solvent, and finally stirring at 120° C. for 10 min to completely dissolve solid raw materials, wherein a whole stirring process is performed under a condition of nitrogen flow to obtain a reaction precursor solution;

(3) adding 16 mmol of oleylamine and 16 mmol of oleic acid to the reaction precursor solution obtained in step (2), and continuing stirring at 120° C. until the solution is completely and uniformly mixed, and continuing to pass nitrogen into a reaction system;

(4) heating the solution completely and uniformly mixed in step (3) to a temperature of 330° C., performing reflux condensation for 3 hours, wherein a whole reaction process is controlled to be carried out under agitation and nitrogen flow;

(5) after the reaction is completed, terminating heating and allowing the reaction solution to cool naturally at a room temperature, when the temperature drops to 80° C., adding 100 ml of a mixed solvent composed of anhydrous ethanol and n-hexane in a volume ratio of 1:1 to an obtained product, then dividing into aliquots and transferring into a centrifuge tube, centrifuging at 5000 r/min, removing a supernatant with yellow-brown color obtained by centrifugation, and then adding an identical mixed solvent with the same proportion to the centrifuge tube, centrifuging, and repeating the operation four times in the same way until the supernatant is colorless and transparent, and in such a manner that a washed black residual product is obtained, that is, the $Fe_{43.4}Pt_{52.3}Cu_{4.3}$ polyhedron nanoparticle with the heterogeneous phase structure according to the present invention.

Identical test method as in Embodiment 1 was used to test the $Fe_{43.4}Pt_{52.3}Cu_{4.3}$ heterogeneous phase structure polyhedron nanoparticles prepared in the above Embodiment 2 and Embodiment 3. The STEM, particle size statistical analysis, crystal structure analysis, and high-resolution STEM and surface-exposed crystal plane analysis results of individual $Fe_{43.4}Pt_{52.3}Cu_{4.3}$ heterogeneous phase structure polyhedron nanoparticle is basically consistent with the test results of the product obtained in Embodiment 1.

Application Embodiment 1

The $Fe_{43.4}Pt_{52.3}Cu_{4.3}$ heterogeneous phase structure polyhedron nanoparticles obtained in the above Embodiment 1 are used to prepare an ORR catalyst. The method comprises the following steps of:

(1) dispersing the $Fe_{43.4}Pt_{52.3}Cu_{4.3}$ heterogeneous phase structure polyhedron nanoparticles powder obtained in Embodiment 1 in 10 ml of hexane, and performing ultrasonic treatment for 10 minutes until the dispersion is uniform, so as to obtain a $Fe_{43.4}Pt_{52.3}Cu_{4.3}$ dispersion;

(2) taking 1 ml of the dispersion obtained in step (1), vacuum drying to obtain a powder, and testing XRF to obtain granular components;

(3) taking 0.1 to 0.5 ml of the dispersion obtained in step (1) and diluting to 2 ml with hexane.

(4) adding 1 to 3 mg of Cabot carbon black to the diluted solution obtained in step (3), dispersing ultrasonically for 1 h, and supporting the nanoparticles on the Cabot carbon black;

(5) after centrifuging at 5000 r/min and removing a supernatant, adding opropanol and diluted Nafion mixed solution with a volume ratio of 20:1 to the system to 1 ml, and performing ultrasonic treatment for 10 minutes to uniformly mix to obtain ORR catalyst dripping solution.

The obtained catalyst is tested for electrochemical performance. The electrochemical test method is as follows:

The equipment adopts Chenhua CHI 760 electrochemical workstation and PINE rotating disk electrode. The electrochemical test adopts a three-electrode test system. The Ag/AgCl electrode is the reference electrode, platinum is a counter electrode, and the catalyst material is coated on a glass-carbon electrode with a diameter of 5 mm as a working electrode. The electrolyte adopts 0.5 mM $H_2SO_4$. A cyclic voltammetry scanning speed is 50 m V/s, a polarization curve scanning speed is 5 mV/s, and a rotating electrode speed is 1600 r/min.

Figure 4:
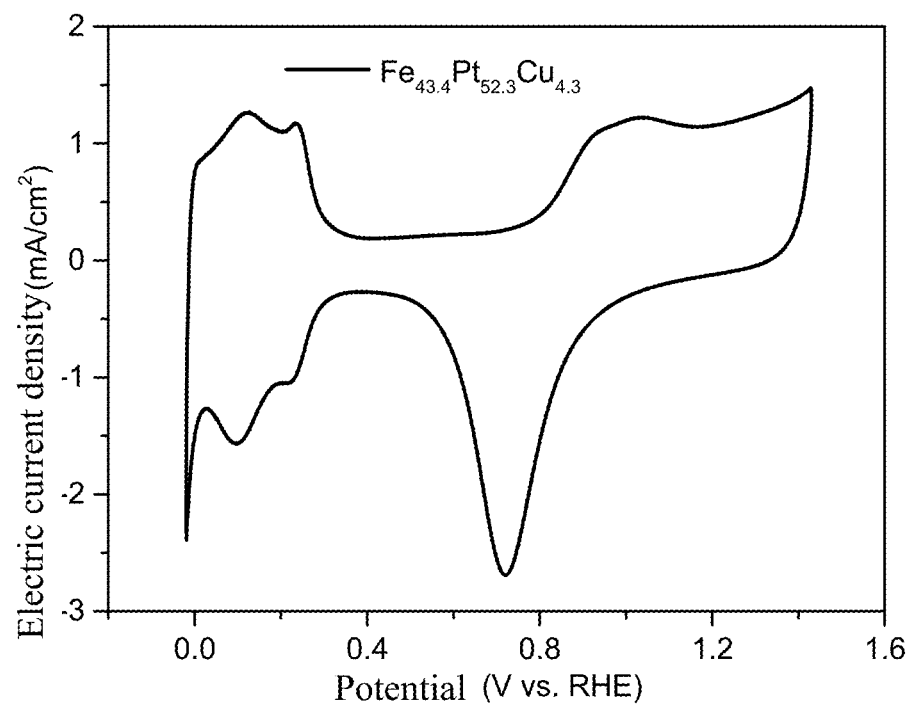
FIG. 4(a) and FIG. 4(b) are cyclic voltammograms of $Fe_{43.4}Pt_{52.3}Cu_{4.3}$ polyhedral nanoparticles and a commercial Pt/C catalyst prepared in Embodiment 1 of the present invention.
Figure 4:
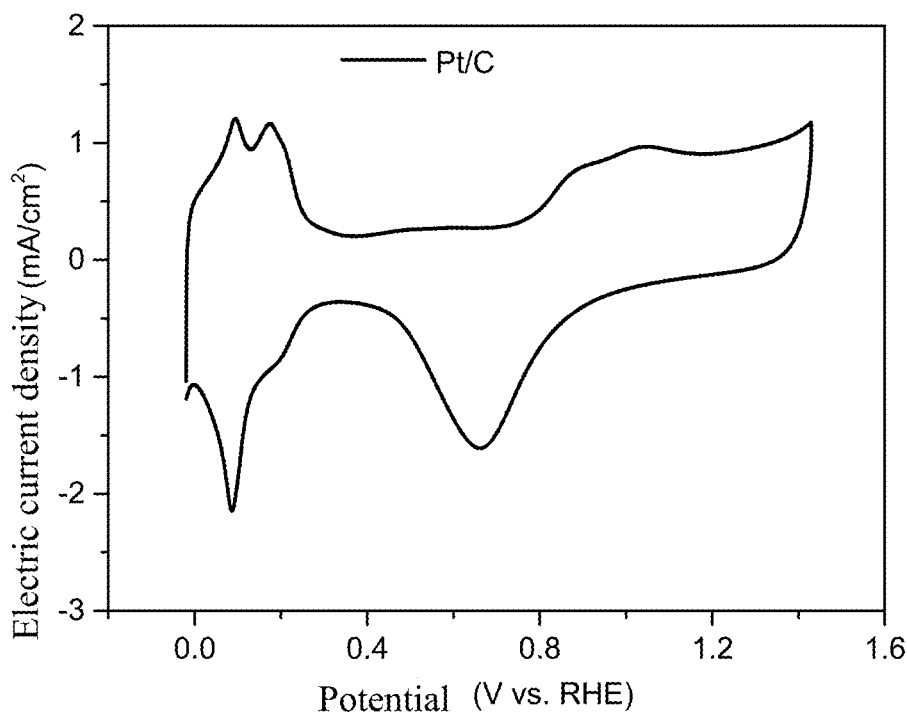
Figure 5:
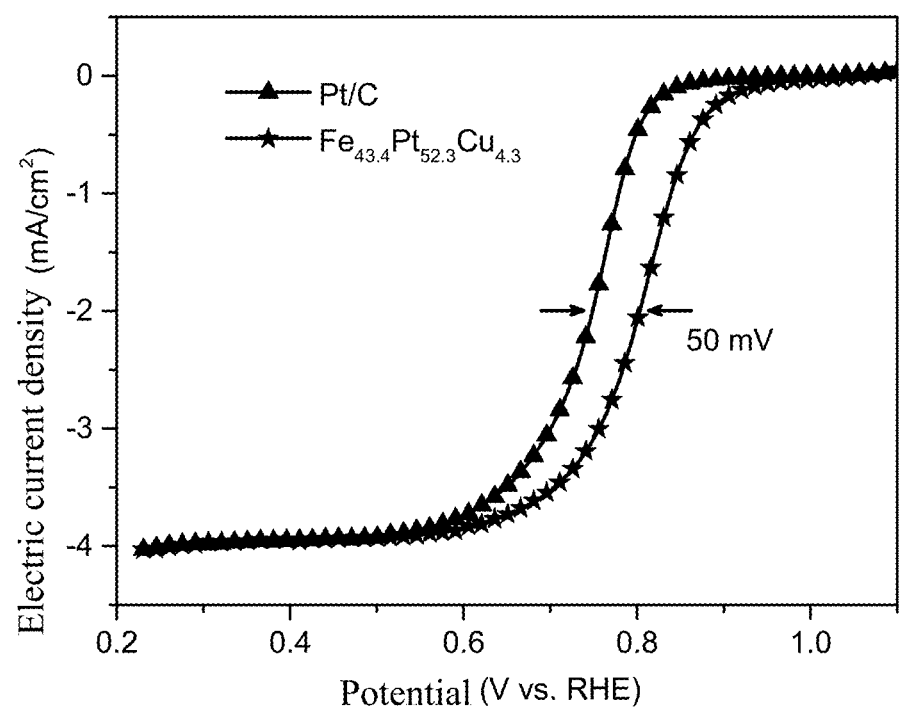
FIG. 5 is a comparison diagram of an ORR polarization curve of a $Fe_{43.4}Pt_{52.3}Cu_{4.3}$ polyhedral nanoparticle and a commercial Pt/C catalyst prepared in Embodiment 1 of the present invention.

FIG. 4 is a cyclic voltammetry curve comparison of $Fe_{43.4}Pt_{52.3}Cu_{4.3}$ nanoparticle and commercial Pt/C in argon-saturated 0.5 mM $H_2SO_4$ electrolyte, with a scanning speed of 50 mV/s. FIG. 5 is a comparison chart of the linear scanning voltammetry curve of $Fe_{43.4}Pt_{52.3}Cu_{4.3}$ nanoparticles and commercial Pt/C in oxygen-saturated 0.5 mM $H_2SO_4$ electrolyte. The scanning speed is 5 mV/s and the rotating disk electrode speed is 1600 r/min. As can be seen from the test results in FIGS. 4 and 5, $Fe_{43.4}Pt_{52.3}Cu_{4.3}$ polyhedral nanoparticles have excellent ORR performance with a half-wave potential of 0.80V, which is better than the half-wave of commercial Pt/C catalysts under the same test conditions with a potential of 0.75V, wherein the polarization voltage is reduced by 50 mV. Under half-wave potential conditions, the mass activity of $Fe_{43.4}Pt_{52.3}Cu_{4.3}$ polyhedral nanoparticles is 10.9 times that of commercial Pt/C.

Figure 6:
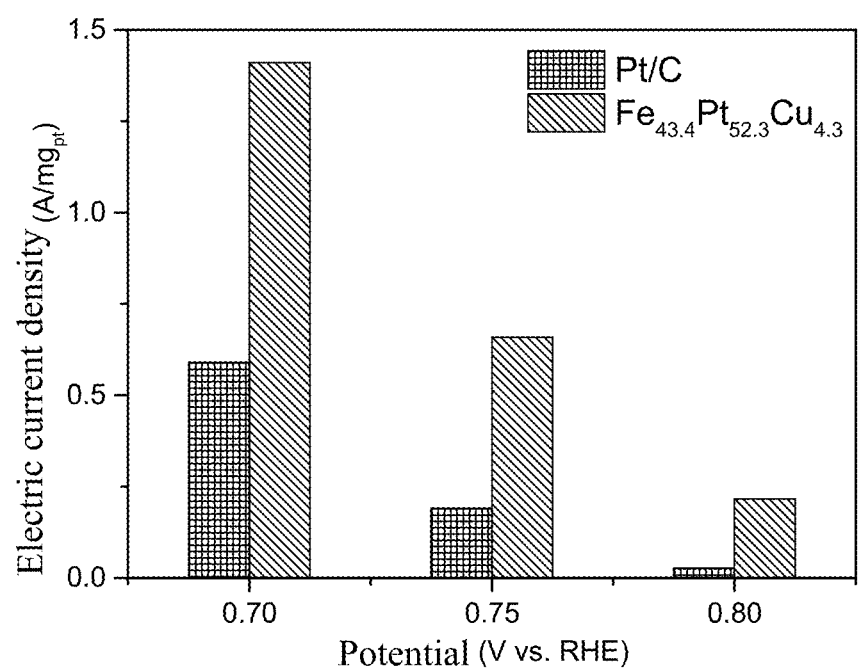
FIG. 6 is a graph comparing the mass activity of $Fe_{43.4}Pt_{52.3}Cu_{4.3}$ polyhedral nanoparticles and a commercial Pt/C catalyst prepared in Embodiment 1 of the present invention.

FIG. 6 shows the calculated results of the mass activity of the $Fe_{43.4}Pt_{52.3}Cu_{4.3}$ nanoparticles and commercial Pt/C at different electrode potentials. It can be seen from FIG. 6 that the $Fe_{43.4}Pt_{52.3}Cu_{4.3}$ polyhedral nanoparticles synthesized by the present invention have more excellent mass activity than Pt/C.

What is claimed is:

1. A $Fe_{43.4}Pt_{52.3}Cu_{4.3}$ heterogeneous phase structure polyhedron nanoparticle, comprising: three elements of Fe, Pt and Cu; wherein the $Fe_{43.4}Pt_{52.3}Cu_{4.3}$ heterogeneous phase structure polyhedron nanoparticle has a heterogeneous phase structure in which face-centered cubic and face-centered tetragonal coexist; wherein the heterogeneous phase structure is a face-centered tetragonal phase shell and face-centered cubic core with a high crystal plane index; a surface of the polyhedron nanoparticle has 1 to 2 atomic layers enriched with Pt; a diameter distribution of the nanoparticles is at a range of 4.5 to 14.5 nm, and an average size is 8.4 nm.

2. A method for preparing the $Fe_{43.4}Pt_{52.3}Cu_{4.3}$ heterogeneous phase structure polyhedron nanoparticle as recited in claim 1, comprising steps of:

(1) taking an amount of liquid cetylamine solvent and placing in a four-necked glass flask, then passing high purity nitrogen into the four-necked glass flask for 20-40 minutes, and then sequentially adding iron acetylacetonate, copper acetylacetonate, platinum acetylacetonate and 1, 2-hexadecanediol to the four-necked glass flask, and finally stirring at 80 to 120° C. until raw materials are completely dissolved, wherein an entire stirring process is performed under a nitrogen flow to obtain a reaction precursor solution;

(2) adding oleylamine and oleic acid to the reaction precursor solution obtained in step (1) according to a molar ratio, and continually stirring at 80-120° C. until completely and uniformly mixed, and continuing to pass nitrogen into a reaction system;

(3) slowly heating the solution obtained by uniformly mixing in step (2) to a temperature at a range of 320-330° C., condensing and refluxing for 3 hours, and controlling an entire reaction process to be performed under stirring and nitrogen flow;

(4) after the reaction is completed, terminating heating, and naturally cooling a temperature of the reaction system to 80° C., taking out the product obtained, centrifuging, washing for 2 to 4 times to obtain a washed black residual product, which is the $Fe_{43.4}Pt_{52.3}Cu_{4.3}$ heterogeneous phase structure polyhedron nanoparticle.

3. The method for preparing the $Fe_{43.4}Pt_{52.3}Cu_{4.3}$ heterogeneous phase structure polyhedron nanoparticle as recited in claim 2, wherein the liquid cetylamine solvent in the step (1) is prepared by melting solid cetylamine, wherein a melting temperature is at a range of 60 to 100° C.

4. The method for preparing the $Fe_{43.4}Pt_{52.3}Cu_{4.3}$ heterogeneous phase structure polyhedron nanoparticle as recited in claim 2, wherein a molar ratio of the iron acetylacetonate, the copper acetylacetonate, and the platinum acetylacetonate in the step (1) is 1:1:2.

5. The method for preparing the $Fe_{43.4}Pt_{52.3}Cu_{4.3}$ heterogeneous phase structure polyhedron nanoparticle as recited in claim 2, wherein an amount ratio of the cetylamine to the platinum acetylacetonate in step (1) is 50 ml:1 mmol.

6. The method for preparing the $Fe_{43.4}Pt_{52.3}Cu_{4.3}$ heterogeneous phase structure polyhedron nanoparticle as recited in claim 2, wherein in step (1), a molar ratio of the platinum acetylacetonate to the 1, 2-hexadecanediol in the step (1) is 4:15.

7. The method for preparing the $Fe_{43.4}Pt_{52.3}Cu_{4.3}$ heterogeneous phase structure polyhedron nanoparticle as recited in claim 2, wherein in step (2), a molar ratio of the oleylamine to the platinum acetylacetonate is 20:1; a molar ratio of the oleylamine to the oleic acid is 1:1.

8. An oxygen reduction catalyst comprising the $Fe_{43.4}Pt_{52.3}Cu_{4.3}$ heterogeneous phase structure polyhedron nanoparticle as recited in claim 1.

\* \* \* \* \*